United States Patent

Gildea et al.

[11] Patent Number: 5,901,326
[45] Date of Patent: May 4, 1999

[54] MEMORY BUS ADDRESS SNOOPER LOGIC FOR DETERMINING MEMORY ACTIVITY WITHOUT PERFORMING MEMORY ACCESSES

[75] Inventors: Kevin J. Gildea, Bloomington; Peter Heiner Hochschild, New York; Peter K. Szwed, Red Hook, all of N.Y.

[73] Assignee: International Business Machines Corporation, Armonk, N.Y.

[21] Appl. No.: 08/756,447

[22] Filed: Nov. 26, 1996

[51] Int. Cl.[6] ............................. G06F 13/00; G06F 13/14; G06F 15/16

[52] U.S. Cl. ............... 395/825; 395/200.43; 395/200.44; 711/146

[58] Field of Search .................................. 395/825, 826, 395/200.44, 200.43, 311

[56] References Cited

U.S. PATENT DOCUMENTS

| | | | |
|---|---|---|---|
| 4,783,730 | 11/1988 | Fischer | 395/825 |
| 5,404,489 | 4/1995 | Woods et al. | 395/425 |
| 5,410,654 | 4/1995 | Foster et al. | 395/275 |
| 5,428,761 | 6/1995 | Herlihy et al. | 395/425 |
| 5,502,828 | 3/1996 | Shah | 395/403 |

OTHER PUBLICATIONS

IBM Technical Disclosure Bulletin, vol. 32, No. 11, Apr. 1990, pp. 170–171 "Snoop Mechanism To Monitor Computer Bus".

*Primary Examiner*—Dung C. Dinh
*Assistant Examiner*—Stephanie D. Hicks
*Attorney, Agent, or Firm*—Floyd A. Gonzalez; Fishman, Dionne, Cantor & Colburn

[57] ABSTRACT

A parallel multiprocessor data processing system having a plurality of nodes for processing data and a switch connected to each of said nodes for switching messages between the nodes, each node having a node processor for defining messages under program control to be sent to another node. Each of the nodes has an I/O processor for controlling the sending of messages to another node via the switch, and a shared memory which can be accessed by both the node processor and the I/O processor. Instructions for the messages to be sent by the I/O processor are stored in mailboxes in the shared memory by the node processor. A comparing circuit compares addresses on the bus to the contents of a plurality of address registers and sets the corresponding bit in a results register for each match. The adapter processor reads the contents of the results register such that the adapter processor may, with a single bus access, determine all mailboxes that have been accessed by the node processor.

9 Claims, 5 Drawing Sheets

MEMORY BUS ADDRESS SNOOPER LOGIC FOR DETERMINING MEMORY ACTIVITY WITHOUT PERFORMING MEMORY ACCESSES

The present invention relates to memory address snooper logic, and more particularly relates to determining memory activity without memory accesses.

BACKGROUND OF THE INVENTION

In a computing system with multiple processors, a typical method of inter-processor communication is via messages in a memory space accessible to both the sending and receiving processor. An example would be in a design of an I/O processor wherein the host processor desires to communicate with the I/O processor. The host processor writes instructions into a reserved area of memory accessible to both processors. The I/O processor realizes that the host processor has communicated to it by continuously polling the area in the memory reserved for host-I/O communications. If there are several programs running on the host processor that communicate with the I/O processor, there may be several reserved areas in the common memory that the I/O processor must poll. As the number of addresses that the I/O processor has to poll grows, the system performance will go down. This degradation is due to the I/O processor having to be granted ownership of the common memory bus every time it reads the memory. While the I/O processor owns the memory bus, the host processor must wait to access the common memory.

U.S. Pat. No. 5,404,489 issued Apr. 4, 1995 to Woods et al. for SYSTEM AND METHOD FOR MINIMIZING CACHE INTERRUPTIONS BY INHIBITING SNOOP CYCLES IF ACCESS IS TO AN EXCLUSIVE PAGE, and discloses a memory property tagging apparatus interfaced with one or more caches which are associated with one or more microprocessors of a multiprocessor system having shared memory and a bus network. The apparatus masks off any snoop cycles on the bus network if data corresponding to an address is exclusive to its associated microprocessor (s).

U.S. Pat. No. 5,410,654 issued Apr. 25, 1995 to Foster et al. for INTERFACE WITH ADDRESS DECODER FOR SELECTIVELY GENERATING FIRST AND SECOND ADDRESS AND CONTROL SIGNALS RESPECTIVELY IN RESPONSE TO RECEIVED ADDRESS AND CONTROL SIGNALS, and discloses interface circuitry for coupling to a microprocessor device. The interface circuitry includes circuitry for determining if a microprocessor-generated memory access is directed to a private memory, accessible only by the microprocessor device, or to a shared memory that is accessible by a plurality of microprocessor devices The interface circuitry includes a circuit for snooping the local bus.

U.S. Pat. No. 5,428,761 issued Jun. 27, 1995 to Herlihy et al. for SYSTEM FOR ACHIEVING ATOMIC NON-SEQUENTIAL MULTI-WORD OPERATIONS IN SHARED MEMORY, and discloses a computer system having a snoop mechanism for monitoring a bus to a shared memory to see if another processor references selected locations.

U.S. Pat. No. 5,502,828 issued Mar. 26, 1996 to Shah for REDUCING MEMORY ACCESS IN A MULTI-CACHE MULTIPROCESSING ENVIRONMENT WITH EACH CACHE MAPPED INTO DIFFERENT AREAS OF MAIN MEMORY TO AVOID CONTENTION, and discloses a cache control circuit for reducing accesses of main memory in a multiple cache multiprocessing system.

IBM Technical Disclosure Bulletin, vol. 32, No. Apr. 11, 1990, Pages 170–171, for SNOOP MECHANISM TO MONITOR COMPUTER BUS, discloses a mechanism for snooping the bus wherein the mechanism includes two registers used to specify the range of addresses to snoop, and wherein the address on the bus is fed into the control logic which is compared to see whether it is within the range.

SUMMARY OF THE INVENTION

The present invention includes circuitry for reducing the number of memory bus accesses a processor must make in polling memory for communication messages. In particular, the circuitry snoops the common memory address bus, and sets bits in a snoop results register corresponding to different programmable address ranges when write accesses occur to the specified address ranges. Therefore, the receiving processor needs only to make a single bus access in reading the snoop results register to effectively poll the memory for communication messages.

It is thus a primary object of the present invention to provide circuitry which reduces memory accesses to poll communications stored in a shared memory for a receiving processor.

It is another object of the present invention to provide snoop circuitry which may be loaded with memory addresses, the snoop circuitry including a comparison circuit which snoops addresses on a bus and compares them to the loaded addresses, and a results register which indicates the results of the comparisons.

It is a further object of the invention to provide a computer program which accesses the results register with a single bus access, which single bus access the ability to poll all of the loaded memory addresses without further memory or bus accesses.

The foregoing and other objects features and advantages of the invention will be apparent from the following more particular description of the preferred embodiment of the invention as illustrated in the drawings.

DESCRIPTION OF THE PREFERRED EMBODIMENT

Figure 1:
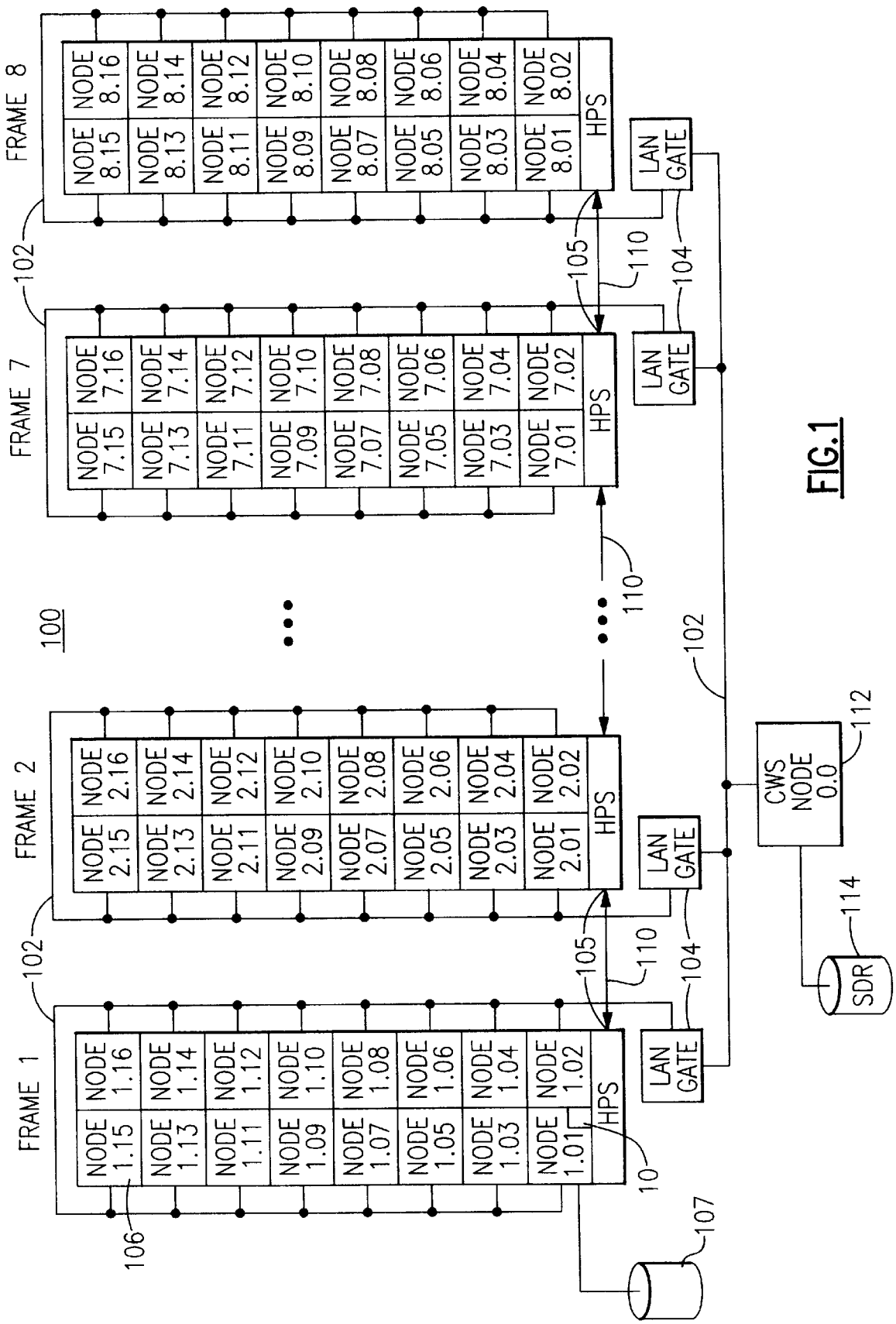
FIG. 1 is a schematic diagram of a distributed computer system having a plurality of nodes connected by switches, each node connected to the switches by a switch interface circuit.

FIG. 1 is a schematic diagram of a distributed computer system 1001 which may be an IBM RISC System/6000

Scalable POWERparallel Systems (SP) distributed computer system available from International Business Machines Corporation of Armonk, N.Y. The embodiment disclosed in FIG. 1 is an SP computer having a total of 8 frames, with each frame having up to 16 nodes, for a total of 128 nodes. All of the nodes 106 are joined by a local area network (LAN) 102. Each node 106 is a computer itself, and may be a RISC System/6000 workstation, as is well known by those skilled in the art.

All of the nodes in a frame of the SP computer 100 are included in a LAN segment which is joined by the other LAN segments through LAN gates 104. Also connected to the LAN 102, is a control workstation (CWS) 112 which controls operation of the SP computer 100. The control workstation has a direct access storage device (DASD) 114 on which is stored the system data repository files (SDR). The SDR files include such information as a list of nodes that are in the system and their configuration. Each node 106 also includes a DASD device 107 for storing data processed by the SP computer 100.

In the present embodiment, the nodes in each frame are also connected to an IBM Scalable POWERparallel high performance switch (HPS) 105. Each of the HPS switches 105 of each frame is connected to neighboring HPS switches 105 of other frames by a bus 110. Each of the nodes 106 is connected to the HPS switch 105 by a switch adapter 10.

As well understood in the art, the CWS node 112 sends system data and control signals to the frames of the SP computer 100 by means of the LAN 102 while messages and data may be sent from one to another of the nodes 106 by means of the high performance switches 105.

Figure 2:
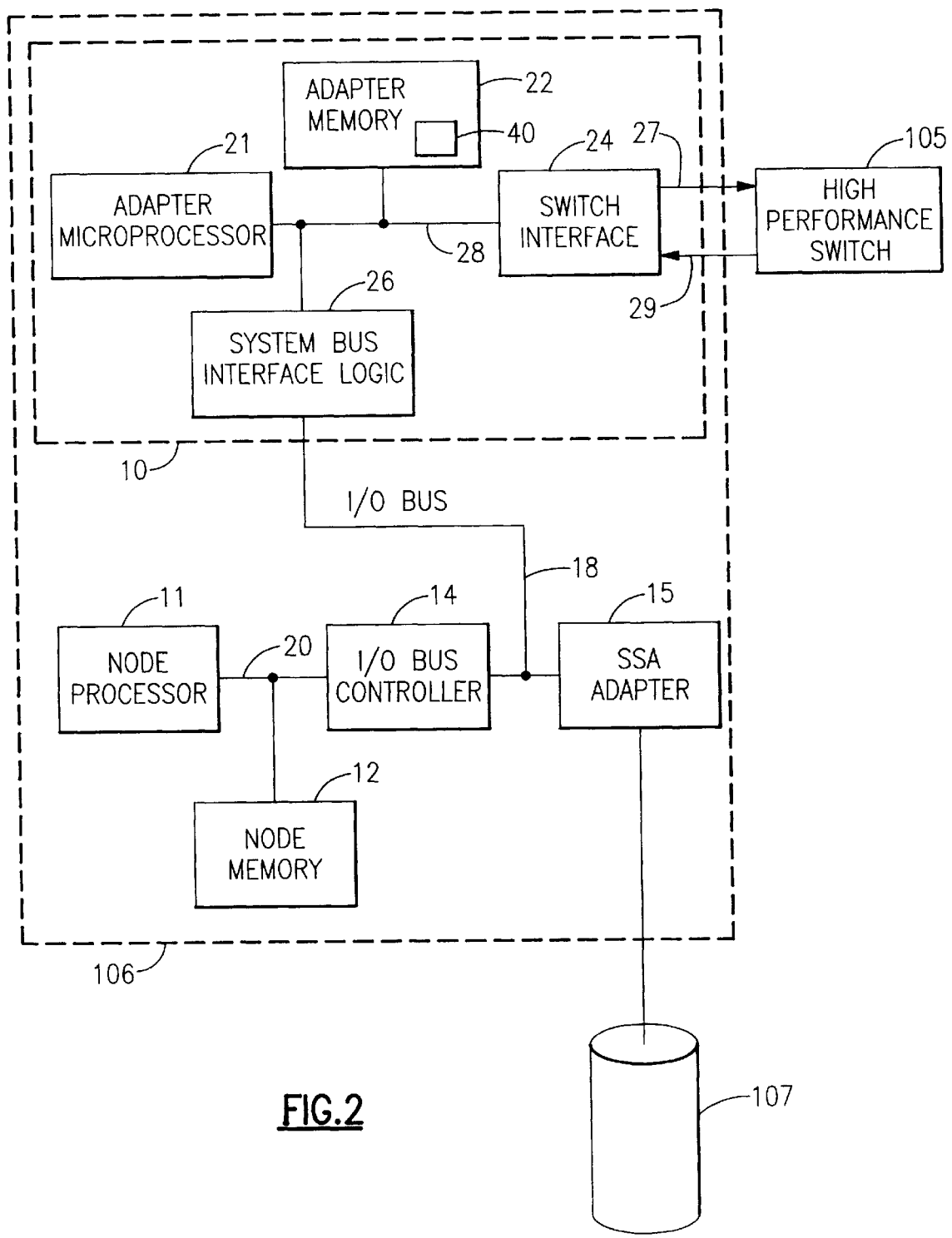
FIG. 2 is a schematic diagram of a node of the computer system of FIG. 1, the node having a microprocessor, a local memory and an switch interface circuit.

FIG. 2 is a schematic diagram of each of the nodes 106 of the SP computer system 100. Each node 106 includes a switch adapter 10, a node processor 11, a node memory 12, an I/O bus controller 14, and an adapter such as a Serial Storage Architecture (SSA) adapter 15. The I/O bus controller 14 controls a microchannel system I/O bus 18, which controls the passing of data to and from the DASD device 107 via the SSA adapter 15 and the switch adapter 10, as will be discussed The node memory 12 is connected to the node processor 11 and the I/O bus controller 14 by a local node bus 20.

The switch adapter 10 includes an adapter processor 21, an adapter memory 22, a switch interface circuit 24, and a system bus interface logic circuit 26, all connected to a local adapter bus 28. The adapter microprocessor 21 may be a PowerPC 601 microprocessor available from IBM. The adapter memory 22 includes a memory portion in which communications are to be stored The switch interface circuit 24 is connected to an output bus 27, and an input bus 29, which are in turn connected to the high performance HPS switch 105. The system bus interface logic 26 provides for the passing of data between the microchannel system I/O bus 18 and the local adapter bus 28, and may be an appropriately programmed Field Programmable Gate Array (FPGA) such as an FPGA available from Xilinx Corp, as is well known.

In the present embodiment, it will be understood that the node 11 processor acts as a host processor, and the adapter processor 21 acts as an I/O processor.

Communication between the node processor 11 and the adapter processor 21 is via a mailbox scheme. When a particular program on the node 106 wishes to communicate information to the adapter processor 21, it writes the information into the adapter memory 22 inside of an address range in memory portion 40 reserved for that program (the programs mailbox). The adapter processor 21 would normally realize that a program has placed information into the adapter memory 22 by polling all of the mailboxes in memory portion 40 looking for a change in the contents. With the present invention, the polling of multiple memory addresses is not necessary. The RANGE registers 30, to be discussed, are set up to correspond to the different program mailbox addresses in the adapter memory 22. Whenever a program writes to its mailbox, a corresponding bit is set in the results register 35, to be discussed To realize if any mailboxes have been written to, the adapter processor 21 only has to read the results register 35. The bits that are set in the results register 35 will correspond to the programs that wrote to their mailbox since the last time that the results register was read, as will be discussed.

Figure 3:
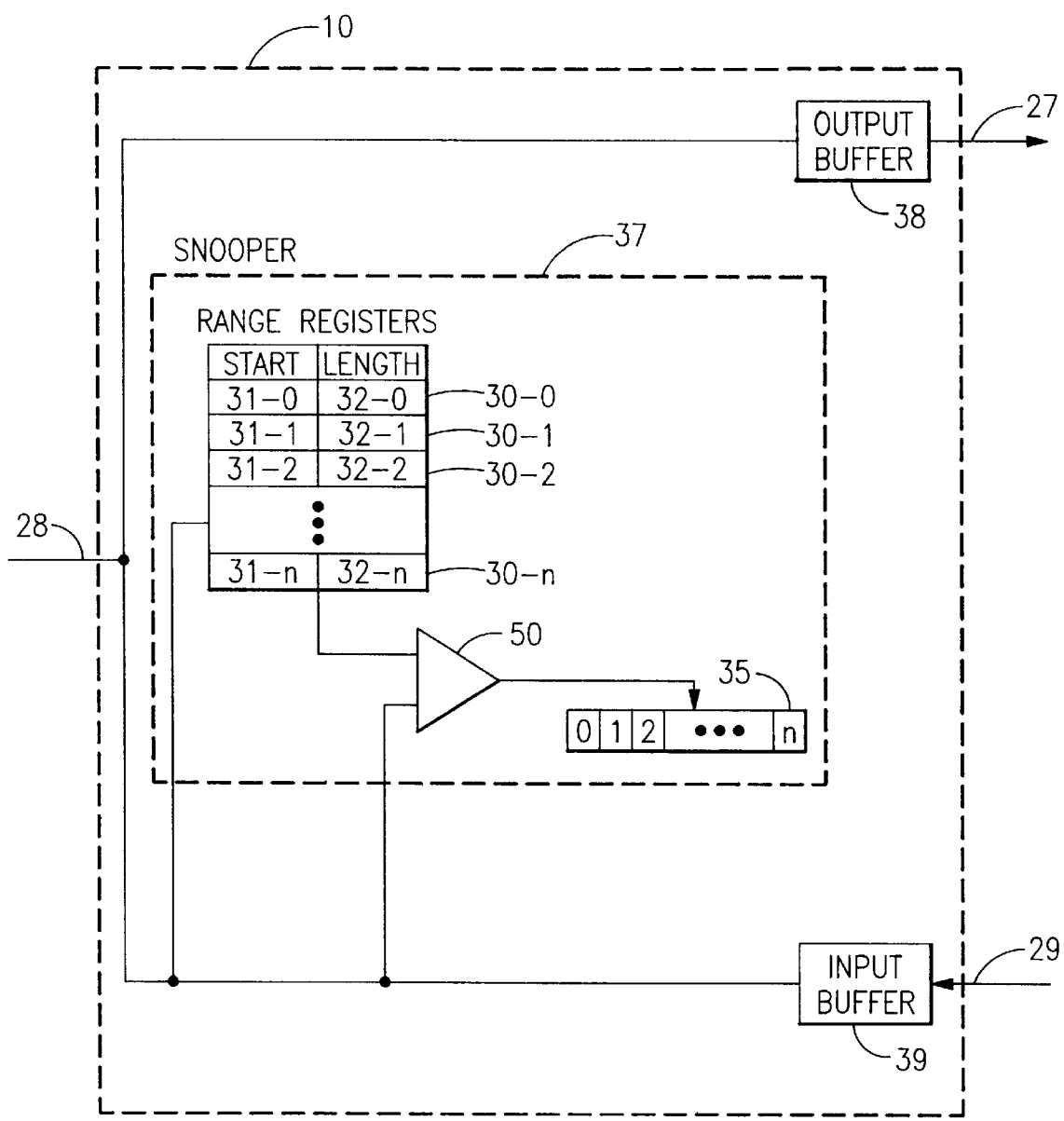
FIG. 3 is a schematic diagram of a portion of the switch interface circuit of the node of FIG. 2.

FIG. 3 is a schematic diagram of a portion of the switch interface circuit 24, and has a snooper circuit 37 connected to the local adapter bus 28, an output buffer circuit 38 connected between the local adapter bus 28 and the output bus 27, and an input buffer circuit 39 connected between the local adapter bus 28 and the input bus 29. The snooper circuit 37 includes a plurality of RANGE registers 30 numbered from 30-0 to 30-n. Each RANGE register 30 has a START register 31 and a LENGTH mask register 32. The snooper circuit 37 also includes a result register 35 having a bit for each RANGE register 30. The RANGE registers 30-0 to 30-n are connected to the local adapter bus 28, and may be loaded by the adapter microprocessor 21 with data representing the memory addresses for the memory portion 40, to be explained. A comparison circuit 50 then compares the addresses on the local adapter bus 28 with the addresses in the RANGE registers 30-0 to 30-n, and sets the appropriate bit in the results register 35, as will be explained in connection with FIG. 5.

Figure 4:
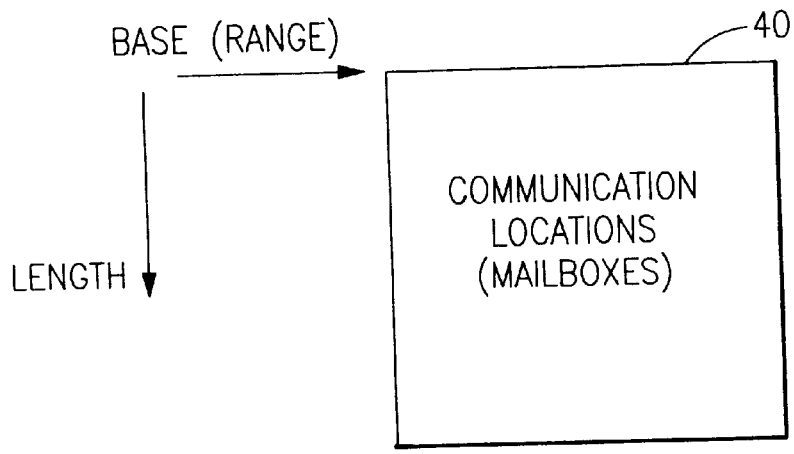
FIG. 4 is diagram of the locations of a portion of the local memory of the node of FIG. 2 which memory portion is used for communications with the node.

FIG. 4 is a block diagram representing the memory portion 40 of the local memory 12 wherein data is stored to indicate that a message for the node needs to be processed. For instance, when a message is received from the system I/O bus 18, data is placed a mailbox in the memory portion 40 indicating, for instance, the length of the message, the amount of data in the message, and the type of message being received. By examining this information, the processor 11 knows the amount of work that needs to be done to process this message, and how the message is to be processed.

By examining the addresses on the local adapter bus 28, it is possible for the snooper circuit 37 to know which locations or mailboxes in the memory portion 40 is being addressed. The proper bit in the results register 35 which corresponds to the location being addressed is then set. In this way, a representation of all the locations or mailboxes in memory portion 40 addressed since the last time the results register 35 was cleared is made. The processor 11 may then read the contents of the results register 35 over the local adapter bus 28, and thus learn all of the mailboxes in the memory portion 40 that have been addressed without having to poll each of the mailboxes in 40 individually. The results register 35 is then cleared, and the messages represented by the set bits processed.

Figure 5:
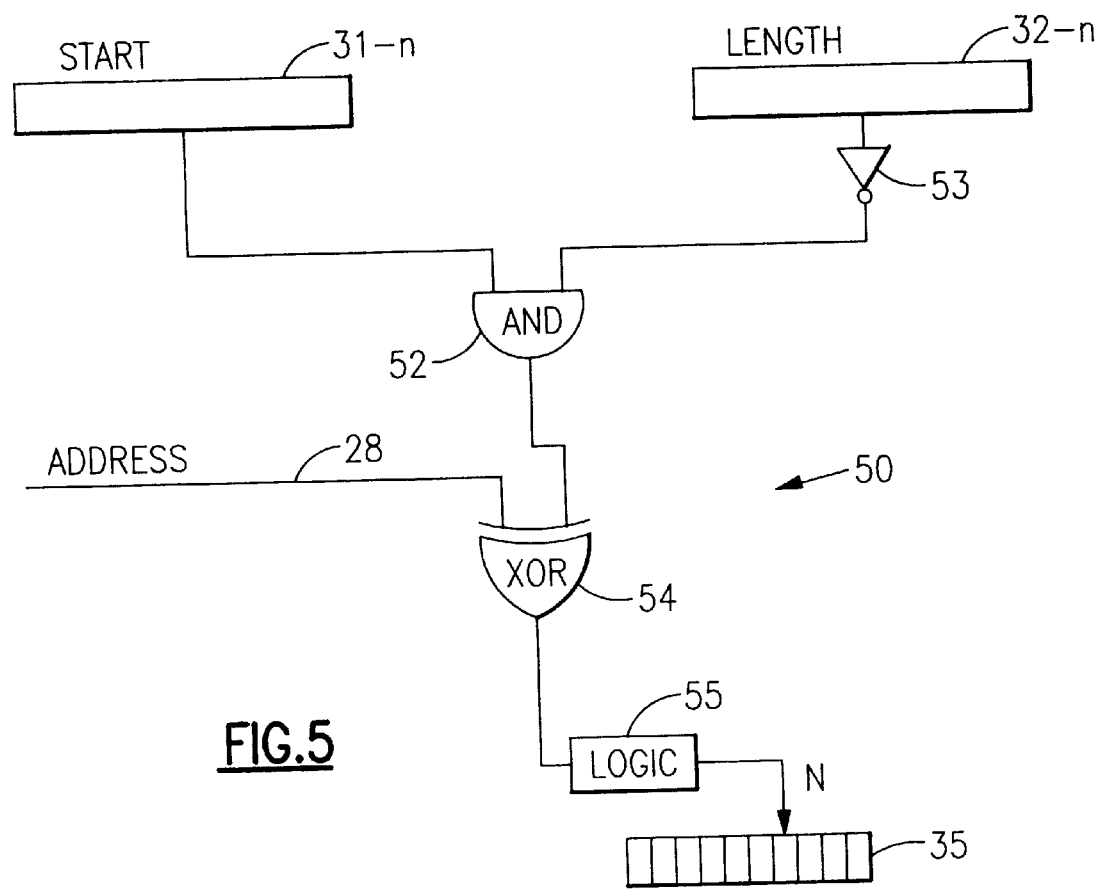
FIG. 5 is a schematic diagram of the compare circuitry of the switch interface circuit of FIG. 2.

FIG. 5 is a schematic diagram of a portion of the snooper circuit 37, and includes the Nth one of the START registers 31-n, a corresponding one of the LENGTH mask registers 32-n, a comparing circuit 50, and the results register 35. The output of the START register 31-n is connected to one input of an AND gate 52, the output of the LENGTH mask register 32-n is inverted by an inverter 53, whose output is connected to the other input of the AND gate 52. The output of the AND gate 52 is connected to one input of an XOR gate 54, and the local adapter bus 28 is connected to the other input of the XOR gate 54. The output of the XOR gate is in turn connected to logic 55 which sets the corresponding n bit of the results register 35. As previously explained, the results register 35 contains one bit for each of the RANGE registers 30. The AND gate 52 combines the contents of the START register 31-n and the LENGTH mask register 32-n, which combination is compared by the XOR gate 54 to the address on the local adapter bus 28, as previously explained. If all of the bits in the compare are equal to zero, then a match has occurred and the corresponding Nth bit of the results register 35 is set. Thus, if the node originated memory address falls within an address range that is specified by the START and LENGTH mask registers, then the logic 55 of the snooper circuit 37 sets a corresponding bit in the results register 35.

The RANGE registers 30 are registers that are read/writable via the local adapter bus 28 and define the address ranges that are being detected by the snoop circuit 37. As previously discussed, each address range has two registers associated with it: the STARTn register 31-n and the LENGTHn mask register 32-n. For each set of RANGE registers 30, the compare circuitry 50 will analyze the address of each write transaction on the memory bus. If the write address matches the bits in the STARTn register 31-n that correspond to the bits not set in the LENGTHn mask register 32-n, then a snoop compare is registered for that range by setting the corresponding n bit in the results register 35.

For example, on a 16 bit address bus, it is desired to snoop compare on all addresses from 0×0000 to 0×00FF, and on all addresses from 0×7E00 to 0×7FFF. Therefore, the RANGE registers 30 for these two ranges would be (for the following example, reference numbers of the START and LENGTH mask registers are shown in parenthesis):

START0 (31-0)=0×0000
LENGTH0 (32-0)=0×00FF
START1 (31-1)=0×7E00
LENGTH1 (32-1)=0×01FF

Given a write address of 0×0021, there would be a snoop compare on address RANGE0 (30-0), therefore, bit 0 of the results register 35 would be set. The LENGTH0 mask register (32-0) specifies that for address range 0, the high 8 bits of the START0 register (31-0) are to be compared with the high 8 bits of each memory write address. In the example, the high 8 bits of the bus address 0×0021 match the high 8 bits of 0×0000 in the START0 register (31-0). Therefore, bit 1 of the results register 35 is set.

Continuing with the example, the LENGTH1 mask register (32-1) specifies that for address range 1, the high 7 bits of the START1 register (31-1) are to be compared with the high 7 bits of each memory write address. In the example, the high 7 bits of the bus address 0×0021 do not match the high 7 bits of 0×7E00 in the START1 register (31-1). Therefore, bit 1 of the results register 35 is not set.

Thus, whenever a snoop compare occurs on the local adapter bus 28, a bit corresponding to the matched address range is set in the results register 35. By reading the results register 35, a processor can find out which, if any, of the programmed address ranges have been written to. The action of reading the results register 35 will reset its contents to zero so that the processor knows that any snoop compares marked in the results register 35 occurred after the last time the register was read.

Figure 6:
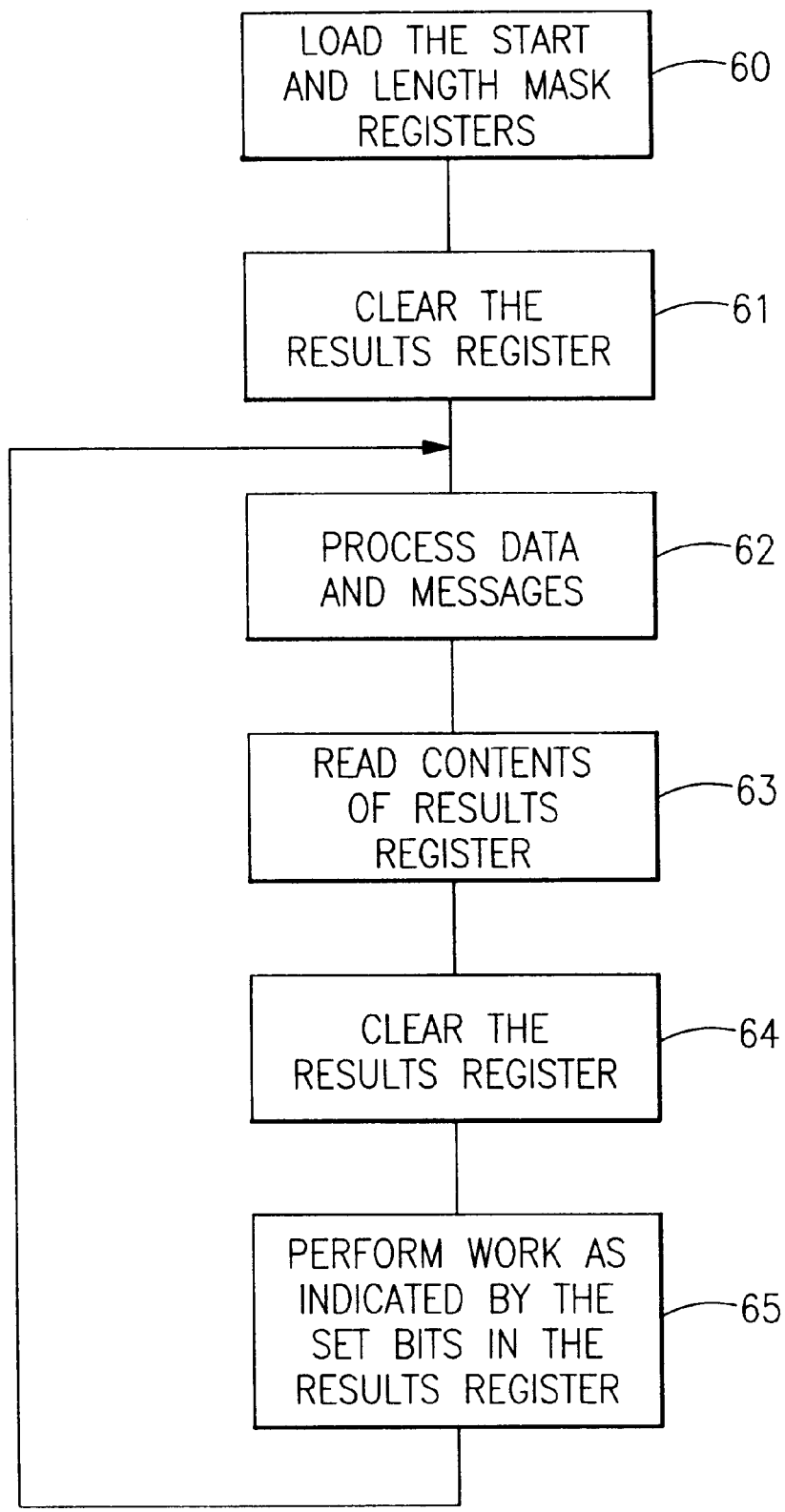
FIG. 6 is flowchart of a program for using a results register of the circuit of FIG. 5 to poll the memory locations of the memory portion of FIG. 4.

FIG. 6 is a flow diagram of a program used by the adapter processor 21 using the results of the snooper circuit 37. At 60 the program loads the START and LENGTH mask registers 31 and 32 of the RANGE registers 30 in the snooper circuit 37 via the local adapter bus 28. At 61, the results register 35 is cleared by making each of the bits equal to zero. At 62, the program processes data and messages by performing tasks and application programs. At 63 the contents of the results register 35 is fetched to determine if any communications were addressed mailboxes in the memory portion 40 of the adapter memory 22. At 64 the results register 35 is cleared by returning all of the bits to zero. At 65, work is performed as indicated by the bits set in the results register to process and communications addressed to mailboxes in the memory portion 40. After completing any work required at 65, the program returns to 62 to continue processing data and messages. It will thus be understood that the present invention allows multiple locations in the communication area of the local memory to be polled with a single access.

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described my invention, what we claim as new, and desire to secure by Letters Patent is:

1. A circuit for providing communications between processors in a data processing system comprising:

an I/O processor controlling I/O operations in said data processing system;

a host processor defining work to be performed by said I/O processor;

a bus between said I/O processor and said host processor;

a shared memory connected to said bus and accessible by both of said I/O processor and said host processor, said shared memory having a plurality of mailboxes therein into which said host processor stores messages specifying work to be performed by said I/O processor;

a snooper circuit connected to said bus, said snooper circuit having a plurality of address registers, each address register containing the address of one of said mailboxes in said shared memory, a results register having a plurality of bits, one bit corresponding to each of said address registers, and a comparing circuit comparing addresses on said bus with the contents of said address registers and setting the corresponding bit in said results register such that the bits set in said results register indicates the presence of messages sent to said mailboxes in said shared memory.

2. The circuit of claim 1 further comprising a program for reading the contents of said results register by said I/O processor such that said I/O processor may determine, with a single bus access, all mailboxes that have received a message.

3. The circuit of claim 1 wherein each of said address registers comprises a START register and a LENGTH mask register to define address ranges starting with the addresses in said START registers and ending with the addresses in said LENGTH mask registers, and said comparing circuit determines if addresses on said bus are in said defined address ranges.

4. The circuit of claim 3 wherein said comparing circuit comprises:

an AND circuit having a first input connected to selected bits of said START registers and a second input connected to selected bits of said LENGTH mask register, and an output;

an XOR circuit having a first input connected to said bus, a second input connected to the output of said AND circuit, and an output; and logic having an input connected to the output of said XOR circuit and an output connected to said results register, said logic for setting the bit in said results register corresponding to the START and LENGTH mask registers whose selected bits match the address on said bus.

5. A data processing system comprising:

a plurality of nodes for processing data;

a switch connected to each of said nodes for switching messages between said nodes;

each node having a node processor for defining messages under program control to be sent to another node;

each of said nodes having a switch adapter connected to said switch, each said switch adapter comprising;
  an adapter processor for controlling sending of messages to another node via said switch;
  a bus connected between said adapter processor and said node processor;
  an adapter memory connected to said bus, said adapter memory having mailboxes in which definitions of messages to be sent to other nodes may be stored by said node processor and read by said adapter processor such that said node processor, under program control, may define work to be performed and said adapter processor, under program control, may receive instructions of work to be performed;
  a plurality of address registers connected to said bus, at least one address register for each of the mailboxes in said memory;
  a results register having one bit for each of said address registers; and
  a comparing circuit connected to said address registers and said bus, said comparing circuit comparing addresses on said bus to the contents of said address registers and setting the corresponding bit in said results register for each match.

6. The data processing system of claim 5 further comprising a program for reading the contents of said results register by said adapter processor such that said adapter processor may, with a single bus access, determine all mailboxes that have received a message.

7. The data processing system of claim 5 wherein each of said address registers comprises a START register and a LENGTH mask register to define address ranges starting with the addresses in said START registers and ending with the addresses in said LENGTH mask registers, and said comparing circuit determines if addresses on said bus are in said defined address ranges.

8. The data processing system of claim 7 wherein said comparing circuit comprises:
  an AND circuit having a first input connected to selected bits of said START registers and a second input connected to selected bits of said LENGTH mask register, and an output;
  an XOR circuit having a first input connected to said bus, a second input connected to the output of said AND circuit, and an output; and logic having an input connected to the output of said XOR circuit and an output connected to said results register, said logic for setting the bit in said results register corresponding to the START and LENGTH mask registers whose selected bits match the address on said bus.

9. The circuit of claim 1 wherein each address register defines a plurality of addresses in said shared memory.

* * * * *

UNITED STATES PATENT AND TRADEMARK OFFICE
CERTIFICATE OF CORRECTION

PATENT NO. : 5,901,326  
DATED : May 4, 1999  
INVENTOR(S) : Gildea et al.

Page 1 of 1

It is certified that error appears in the above-identified patent and that said Letters Patent is hereby corrected as shown below:

Column 2,  
Line 3, after "No." insert -- 11 --;  
Line 3, delete "11" (second occurence);  
Line 35, after "access" (second occurrence) insert -- provides --;  
Line 51, after "and" delete "an" and insert therefor -- a --;  
Line 54, after "is" insert -- a --;  
Line 67, after "system" delete "1001" and insert -- 100, --.

Column 3,  
Line 40, after "discussed" insert -- . --;  
Line 49, after "stored" insert -- . --.

Column 4,  
Line 1, delete "programs" and insert therefor -- programs's --;  
Line 10, after "discussed" insert -- . --;  
Line 39, after "placed" insert -- in --.

Signed and Sealed this

Fifth Day of August, 2003

JAMES E. ROGAN  
*Director of the United States Patent and Trademark Office*